(12) United States Patent
Mahler et al.

(10) Patent No.: US 7,920,529 B1
(45) Date of Patent: Apr. 5, 2011

(54) INTERMEDIARY QUERY MANAGER FOR 2G AND 3G SERVICES

(75) Inventors: Roger Mahler, Marietta, GA (US);
Judith C. Espejo, Snellville, GA (US);
Nhan Tran, Lawrenceville, GA (US);
Lanny Gilbert, Atlanta, GA (US);
Thomas W. Bonner, Smyrna, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 443 days.

(21) Appl. No.: 11/180,135

(22) Filed: Jul. 13, 2005

Related U.S. Application Data

(60) Provisional application No. 60/683,995, filed on May 24, 2005.

(51) Int. Cl.
*H04W 4/00* (2009.01)
(52) U.S. Cl. ..................... 370/338; 455/432.2
(58) Field of Classification Search .................. 370/338; 455/432.1–433
See application file for complete search history.

(56) References Cited

U.S. PATENT DOCUMENTS

| | | | |
|---|---|---|---|
| 5,933,784 A * | 8/1999 | Gallagher et al. | 455/552.1 |
| 6,002,932 A * | 12/1999 | Kingdon et al. | 455/433 |
| 6,353,621 B1 | 3/2002 | Boland et al. | |
| 6,385,451 B1 | 5/2002 | Kalliokulju et al. | |
| 6,389,008 B1 | 5/2002 | Lupien et al. | |
| 6,546,247 B1 | 4/2003 | Foti et al. | |
| 2001/0031635 A1 * | 10/2001 | Bharatia | 455/432 |
| 2002/0131400 A1 * | 9/2002 | Tinsley et al. | 370/352 |
| 2002/0155834 A1 | 10/2002 | Olmstead et al. | |
| 2003/0181206 A1 | 9/2003 | Zhou et al. | |
| 2004/0043776 A1 * | 3/2004 | Tuomela et al. | 455/456.3 |
| 2004/0133685 A1 * | 7/2004 | Jaaskela et al. | 709/227 |
| 2004/0166874 A1 * | 8/2004 | Asokan et al. | 455/456.1 |
| 2004/0186901 A1 * | 9/2004 | Guigui | 709/217 |
| 2004/0196858 A1 | 10/2004 | Tsai et al. | |
| 2004/0199649 A1 * | 10/2004 | Tarnanen et al. | 709/230 |
| 2005/0075106 A1 * | 4/2005 | Jiang | 455/432.3 |
| 2005/0143075 A1 | 6/2005 | Halsell | |
| 2005/0180389 A1 | 8/2005 | Xenakis et al. | |
| 2005/0278447 A1 * | 12/2005 | Raether et al. | 709/227 |
| 2005/0288017 A1 | 12/2005 | Doumenc et al. | |
| 2006/0084431 A1 * | 4/2006 | Hua et al. | 455/433 |

* cited by examiner

*Primary Examiner* — Lester Kincaid
*Assistant Examiner* — Steven Lim

(57) ABSTRACT

An intermediary system that seamlessly evolves the 2G/2.5G storage mediums to the 3G entities (e.g., a logical HSS) and provides subscriber data to 3G services such as IMS, from legacy data sources. An Intermediary Query Manager (IQM) is provided that functions as intermediary/broker system, and supports defined standard 3GPP interfaces specific to the IMS system (utilizing the existing storage medium servicing the PS domain) and also allows the continued support of the 2G/2.5G interfaces to 2G HLRs (servicing the CS domain). The IQM provides the capability to leverage usage of the current subscriber databases without requiring extraordinary efforts to migrate subscriber information to a new dedicated HSS element. The IQM provides data from multiple sources and processes requests necessary to fulfill these requests. The IQM can look like a MSC (Mobile Switching Center), VLR (Visitor Location Register), and/or SCP (Service Control Point) to the HLRs depending on the type of queries.

52 Claims, 13 Drawing Sheets

INTERMEDIARY QUERY MANAGER FOR 2G AND 3G SERVICES

CROSS-REFERENCE TO RELATED APPLICATIONS

This application claims the benefit of U.S. Provisional Patent Application Ser. No. 60/683,995 entitled "INTERMEDIARY QUERY MANAGER FOR 2G AND 3G SERVICES" and filed May 24, 2005, the entirety of which is incorporated by reference herein.

TECHNICAL FIELD

This invention is related to telecommunications networks, and more specifically, to interfacing a new telecom network with a legacy telecom network.

BACKGROUND OF THE INVENTION

Telecommunications is a rapidly evolving industry that has exploded into the market in recent years with all types of mobile communications devices and systems. The advent of the Internet and its vast IP (Internet Protocol) capabilities has opened the door for telecommunications to find ways of providing services that heretofore were not available to the cellular user. However, this rapid convergence of telecommunications systems and the Internet also leaves behind working legacy systems that without some mechanism for bridging the gap into the new technology, will leave customers and companies frustrated. The jump from an existing technology to a newer technology is costly both in terms of corporate resources costs and customer loyalty. Thus, such migrations need to be transparent to the customer, as well as cost effective for the telecom companies.

As defined in the 3GPP ($3^{rd}$ Generation Partnership Project) technical specification TS 23.002 v.6.7.0 (2005-03), the HSS (Home Subscriber Server) is the master database for a given user. The HSS is the entity that contains the subscription-related information to support the network entities actually handling calls/sessions. The HSS concept, developed by the 3GPP standards organization, is designed to address many of the shortcomings of the current 2G ($2^{nd}$ Generation) HLR (Home Location Register) for supporting 3G technology and services.

To support 3G technologies and services, the HSS is designed to inter-network with an IMS (IP Multimedia Subsystem) system, thus introducing new interfaces and requirements. The IMS represents a 3GPP and 3GPP2 effort to define an all-IP based wireless network as a replacement for the disparate voice, data, signaling, and control network elements, and enables the support for IP multimedia applications within the UMTS (Universal Mobile Telecommunications System). The UMTS is a 3G broadband packet-based transmission of text, digitized voice, video, and multimedia that offers a consistent set of services to mobile computer and phone users no matter where they are located in the world.

The telecom industry is currently shifting towards all-IP systems, driven by the fundamental need to reduce costs, create new revenue generating services and to protect the operator business model, and IMS is a new core and service domain that enables the convergence of data, speech and network technology over an IP-based infrastructure. It is the operator choice of control and service logic for IP packet-based communication. For users, IMS-based services enable communications in a variety of modes that include voice, text, pictures and video, or any combination of thereof in a highly personalized and secure way. IMS is designed to fill the gap between the existing traditional telecommunications technology and Internet technology that increased bandwidth alone does not provide, and allows operators to offer new, innovative services that share holders and end users are expecting.

The HSS as specified by 3GPP supports legacy 2G and 2.5G technology (in both domains of CS-circuit switched and PS-packet switched). Requirements specific to the HSS have been or continue to be defined by the 3GPP organization. With most of the requirements already secured, the HSS concept, can become a reality. But the concern of how a carrier should introduce the HSS into a production system remains to be determined.

One concept is introducing the HSS platform as a whole. Although simplistic in concept, this path is not preferred for many reasons. It will be another database type system that the carrier has to manage. Moreover, it will require provisioning development which would be costly and timely. Additionally, it is an inefficient use of capital expenses due to redundancy, since the 2G HLR will continue to be used for 2G services which will also be utilized to support 3G technology (e.g., presence services). Moreover, converting and migrating all applicable applications to the HSS would be costly and disruptive.

Conventionally, such migrations are solved by duplicating data in the network, and never leveraging existing data or business logic. For example, in order to deploy new services in a 3G network, a company will need to deploy subscriber service servers in the network. However, most of the data needed for these servers is already maintained in the network. Nonetheless, a carrier will need to duplicate and maintain multiple copies of the same data in the network. Accordingly, there is a substantial unmet need for a solution that when introducing the HSS, the existing 2G storage medium servicing the CS and PS domains can also be utilized.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention solves the aforementioned problem now encountered with the deployment of 3G services by providing a common interface into the current data architecture necessary to leverage current assets. The invention allows the use of exiting network databases to support 2G and 2.5G technology portions of the HSS (Home Subscriber Server). Additionally, the invention provides for a smoother transition to a "true" HSS database whether the solution includes evolving existing 2G HLRs (Home Location Registers) or other data repository databases to the HSS or by introducing the HSS as a stand-alone element.

The invention provides an intermediary system (with specialized applications) that seamlessly evolves the 2G storage mediums to the HSS. An Intermediary Query Manager (IQM) is provided that functions as intermediary/broker system. The IQM supports the defined standard 3GPP interfaces specific to the IMS system (utilizing the existing storage medium servicing the PS domain) and also allows the continued support of the 2G interfaces to 2G HLR (servicing the CS domain). The IQM provides the capability to leverage usage of the current subscriber databases without requiring extraordinary efforts to migrate subscriber information to a new dedicated HSS element. This project solves the problem arising from the deployment of the IMS and other related projects that provide services in a 3G network. The invention provides a generic/standard mechanism for providing subscriber data to 3G services such as IMS from legacy data sources. The IQM provides data from multiple sources and processes requests necessary to fulfill these requests. The IQM can look like a MSC (Mobile Switching Center), VLR (Visitor Location Register), and/or SCP (Service Control Point) to the HLRs depending on the type of queries (e.g., MAP-Mobile Application Part messages) being sent.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
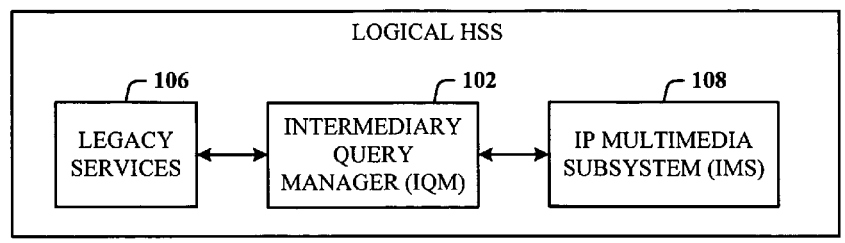
FIG. 1 illustrates a system that facilitates a telecommunications interface in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to the drawings, FIG. 1 illustrates a system 100 that facilitates a telecommunications interface in accordance with the subject invention. The system 100 provides an intermediary query manager (IQM) 102 as part of a new logical technology subscriber database 104 (e.g., the HSS-Home Subscriber Server of 3G) that will broker requests for information between legacy services 106 (e.g., 2G and/or 2.5G services) and an IMS (IP Multimedia Subsystem) system 108. In one implementation, the IQM 102 supports the defined standard 3GPP ($3^{rd}$ Generation Partnership Project) interfaces specific to the IMS system utilizing the existing storage medium servicing the PS (packet-switched) domain and also allows the continued support of the 2G ($2^{nd}$ Generation) interfaces to 2G HLR (Home Location Register) servicing the CS (circuit-switched) domain.

The IQM 102 provides the capability to leverage usage of the current subscriber databases without requiring extraordinary efforts to migrate subscriber information to a new dedicated HSS element. In one application, this invention solves the problem arising from the deployment of the IMS and other related projects that provide services in a 3G network, and provides a generic/standard mechanism for providing subscriber data to 3G services (e.g., IMS) from legacy data sources. The IQM 102 provides data from multiple sources and processes requests necessary to fulfill these requests. The IQM 102 can look like a MSC (Mobile Switching Center), VLR (Visitor Location Register), and/or SCP (Service Control Point) to the HLRs depending on the type of queries (e.g., MAP-Mobile Application Part messages) being sent.

Figure 2:
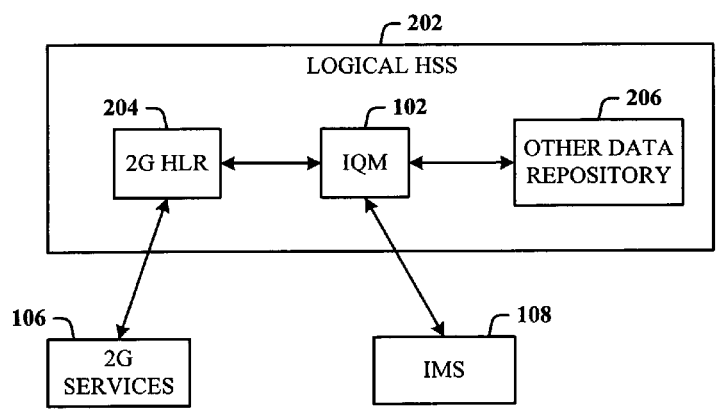
FIG. 2 illustrates a more detailed application of system to 2G/3G telecommunications networks in accordance with the invention.

FIG. 2 illustrates a more detailed application of system 200 to 2G/3G telecommunications networks in accordance with the invention. The system 200 includes an HSS 202 that includes subscription-related information and which the HSS 202 continues to support the legacy 2G services 106 (e.g., PS domain and CS domain) via corresponding HLRs (Home Location Registers) 204. The HSS 202 includes the IQM 102 for providing translation services between at least the IMS 108 and 2G services 106. The HSS 202 can also include one or more other data repository(s) 206. Note that the IQM 102 need not be implemented as part of the HSS 202, but can be an external entity that interfaces to the HSS 202 to accomplish the same functions.

Figure 3:
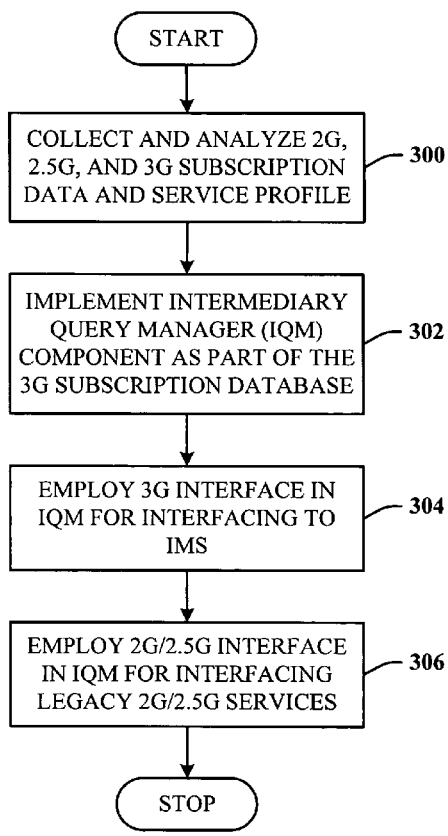
FIG. 3 illustrates a methodology of implementing the IQM in a 2G/2.5G or 3G network in accordance with the invention.

Referring now to FIG. 3, there is illustrated a methodology of implementing the IQM in a 2G/2.5G or 3G network in accordance with the invention. While, for purposes of simplicity of explanation, the one or more methodologies shown herein, e.g., in the form of a flow chart or flow diagram, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 300, a 3G subscription database and legacy services are collected and analyzed. It is to be appreciated that the subject invention is not limited to providing the interface between 2G and 3G technologies, but can also be applied to future technologies and beyond relative to the then legacy services (e.g., 2G and 3G). At 302, the IQM is implemented as part of the new subscriber information database system (e.g., HSS for 3G). At 304, a 3G interface is employed in the IQM for interfacing to the IMS. At 306, a 2G and/or 2.5G interface is employed in the IQM for interfacing to legacy services (e.g., to the HLR function of the HSS).

Figure 4:
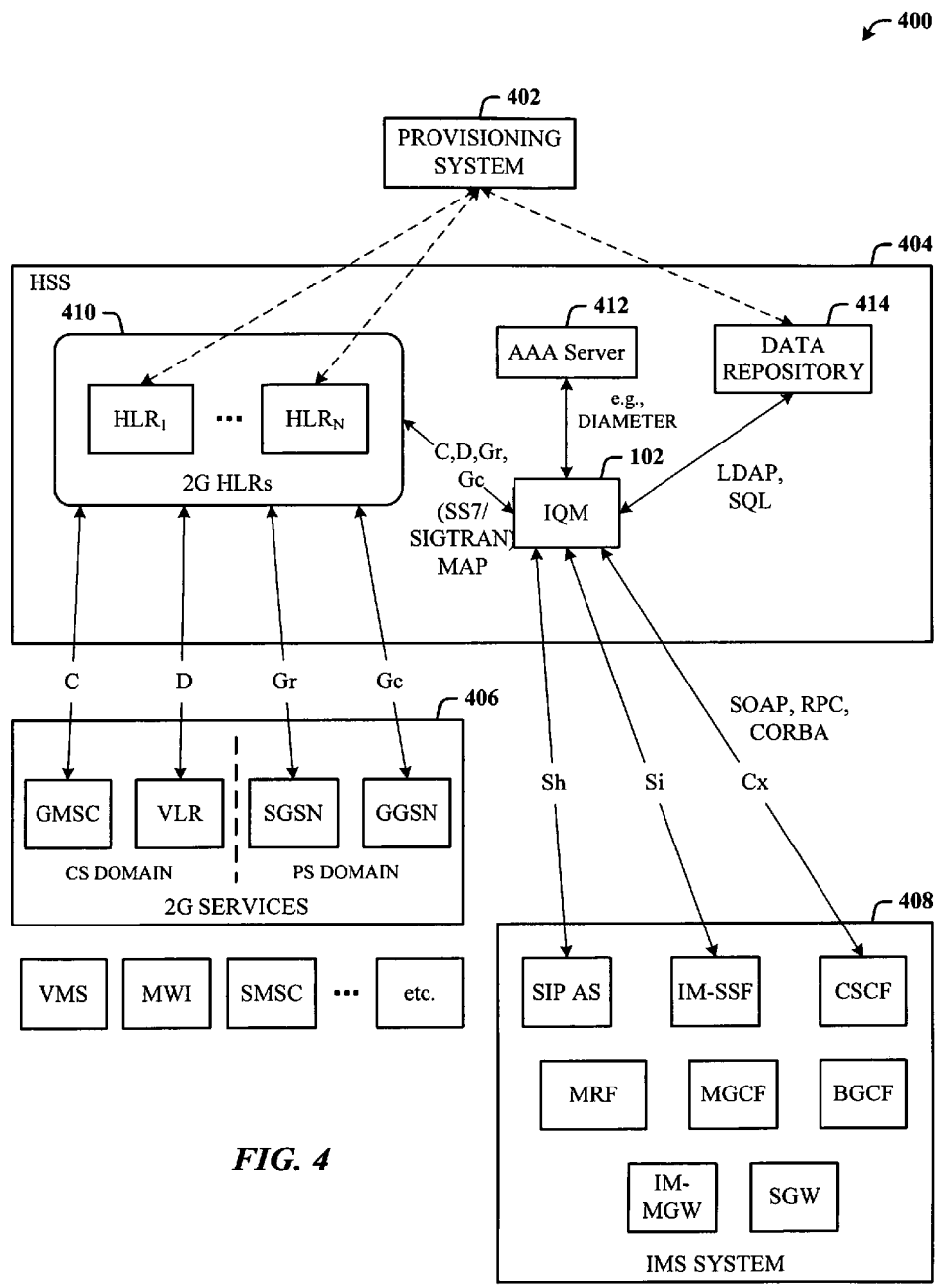
FIG. 4 illustrates a detailed block diagram of a system that facilitates migration between 2G and 3G services in accordance with the invention.

FIG. 4 illustrates a detailed block diagram of a system 400 that facilitates migration between 2G and 3G services in accordance with the invention. The principal entities in this particular implementation include a provisioning system 402 that automates at least a task of flow-through provisioning and activation of multiple communications services over mobile, fixed, 3G and IP networks from a single platform. The provisioning system can include any number or combination of the following: a rules engine, workflow system, a logging system, audit system, a database to support the workflow and auditing tasks, and agents that communicate with applications to add, delete, suspend or change users and privileges.

The system 400 also includes an HSS 404, the conventional function and implementation of which, and other 3G aspects associated therewith and in this description can be found in the 3$^{rd}$ Generation Partnership Project technical specification 3GPP TS 23.002 v6.7.0 (2005-03), the entirety of which is incorporated herein by reference.

The HSS 404 is the master database for any given user and contains the subscription-related information in support of network entities that handling calls and/or sessions. The HSS 404 can take the place of an HLR (Home Location Register) in an all-IP network, and contains an AAA (Authentication, Authorization and Accounting) function and other databases. The HSS 404 includes at least a user ID, numbering and address data, user security data, network access and control data for authentication and authorization, user location data at the inter-system level, user registration, and user profile data.

Logical functions of the HSS 404 include at least the following: mobility management for the user through the CS, PS and IMS domains; user security information generation for user authentication, integrity and ciphering data for CS, PS and IMS domains; user security support by supporting authentication procedures for access to the CS, PS and IMS domains; user ID handling by providing the appropriate relations among all identifiers between the CS, PS and IMS domains; access authorization for authorizing a user for mobile access when requested for roaming to a visited network; service authorization checking for establishing a basic call/session and service invocation; and, service provisioning support by providing service profile data for CS, PS, IMS, application services and CAMEL (Customized Applications for Mobile network Enhanced Logic) service support.

The system 400 also includes 2G/2.5G legacy services 406 and an IMS system 408. The major IMS network elements include: a SIP AS (Session Initiation Protocol Application Server) component that represents a platform for SIP application development and operation; an 1M-SSF (IP Multimedia-Service Switching Function) component which are the basic call state models used to define the call processing architecture within the IMS 408 and that are recognizable to a CAMEL Service Environment; a Call Session Control Function (CSCF) component that provides control and routing function for IP sessions; an MRF (Media Resource Function) component that mixes various conference participant media streams, and which comprises of a MRFC (Media Resource Function Controller) and a MRFP (Media Resource Function Processor); a Media Gateway Control Function (MGCF) component that provides signaling interoperability between IP and PSTN domains; a Breakout Gateway Control Function (BGCF) component that controls resources allocation to IP sessions; an IM-MGW (Media Gateway) that supports both bearer traffic and signaling traffic between IP and the PSTN (Public Switched Telephone Network); and a Signaling Gateway Function (SGW) that performs signaling conversion in both directions at the transport level between SS7 (Signaling System 7) and IP-based transport of signaling.

The legacy 2G/2.5G services 406 interface with HLRs 410 of the HSS 404. The legacy services 406 include a GMSC (Gateway MSC Server) that comprises call control and mobility control parts, and interrogates the HLR 410 of the required subscriber to obtain routing information for a call or a short message directed to that subscriber. The GMSC provides an edge function within a PLMN (Public Land Mobile Network), terminates the PSTN signalling and traffic formats, and converts these formats to protocols employed in mobile networks. The GMSC interacts with the HLR 410 via a C interface.

The legacy services 406 include a VLR that interacts with the HLR 410 via a D interface. The interface is used to exchange data related to location of the mobile station and related to the management of the subscriber. The VLR informs the HLR of the location of the mobile station and provide the HLR with the roaming number of that station. Note that although not shown in the diagram, support for other 2G/2.5G legacy services such as (but not limited to) SMS (Short Message Service), VMS (Voicemail Services), and MWI (Message Waiting Indicator) also requires interaction with the HLR via C and D interfaces.

The legacy services 406 include an SGSN (Serving GPRS Support Node) which keeps track of the location of an individual mobile station and, performs security functions and access control. The SSGN interacts with the HLR 410 via a Gr interface. A GGSN (Gateway GPRS Support Node) of the legacy services supports the edge routing function of the GPRS (General Packet Radio Services) network. To external packet data networks the GGSN performs the task of an IP router. The GGSN also provides firewall and filtering functionality to protect the integrity of the GPRS core network along with a billing function. The GGSN interacts with the HLR 410 via a Gc interface.

The HSS 404 also includes an AAA Server 412 (e.g., using DIAMETER) that allows authentication and authorization, and collects accounting information for Mobile IPv4 services rendered to a mobile node. This application can also allow mobile nodes to receive service from foreign service providers. A data repository 414 facilitates the storage of many types of subscriber and subscription related information. The provisioning system 402 interfaces to each of the HLRs 410 and the data repository 414 for the exchange and updating of subscriber and subscription data.

The system 400 of the subject invention also include the IQM 102 that provides the interface between the IMS 408 and legacy services 406. The SIP AS of the IMS 408 interacts with the HSS 404 via the IQM 102 by way of an Sh interface, the IM-SSF of the IMS 408 interacts with the HSS 404 via the IQM 102 by way of an Si interface, and the CSCF of the IMS 408 interacts with the HSS 404 via the IQM 102 by way of a Cx interface. The Cx interface support SOAP (Simple Object Access Protocol), RPC (Remote Procedure Call) and CORBA (Common Object Request Broker Architecture).

The IQM 102 interfaces to the 2G HLRs 410 of the HSS 404 via a C and/or D interface that supports SS7 and/or SIGTRAN (Signaling Transport) MAP (Mobile Application Part). MAP is a protocol that enables realtime communications between nodes in a mobile cellular network. A typical usage of the MAP protocol is for the transfer of location information from the VLR of services 406 to an HLR 410 of the HSS 404.

The IQM 102 also interfaces to the AAA server 412 using Diameter for example, although any suitable AAA service can be employed. The IQM 102 can interface to the data repository 414 via, for example, LDAP (Lightweight Directory Access Protocol) and SQL (Structured Query Language). Other suitable interface languages and protocols can be employed, as desired.

The IQM 102 is capable of supporting multiple types of query conversion for supporting the IMS 408. Additionally, the IQM 102 can look like either an MSC, a VLR or an SCP, to the HLRs, depending on the type of query (MAP messages) being sent. As indicated supra, communications between the IMS 408 and 2G HLRs of the HSS 404, SS7/SIGTRAN and MAP can be employed. Between the IMS 408 and data repository 414 (with enhancement for support of IMS services), LDAP and/or SQL can be employed.

Figure 5:
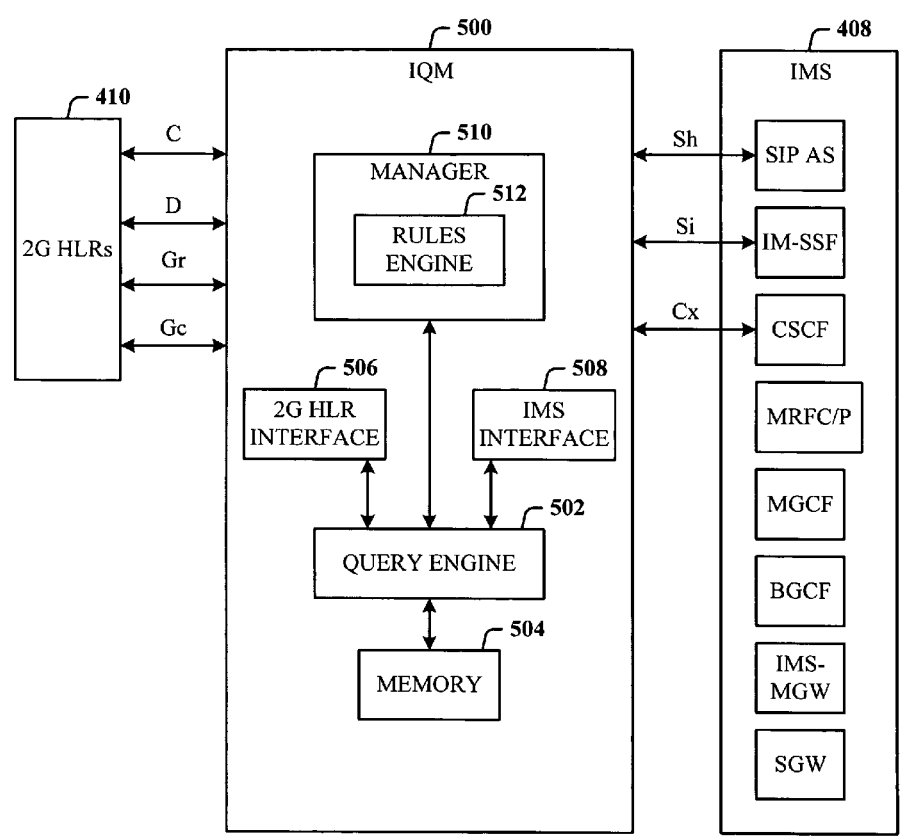
FIG. 5 illustrates a schematic block diagram of an IQM in accordance with the invention.

FIG. 5 illustrates a schematic block diagram of an IQM 500 in accordance with the invention. The IQM 500 can include a query engine 502 that facilitates the processing of substantially simultaneous queries from one or more of the IMS entities (e.g., SIP AS, IM-SSF, CSCF, . . . ), a memory 504 for caching and storage of queries, query applications, and other data and/or instructions, a 2G HLR interface 506 for interfacing to 2G HLR data 410 (via C and D interfaces for the CS and PS domains), and an IMS interface 508 for interfacing to the IMS 408 (via the Sh, Si and Cx interfaces). The IQM 500 can also include a manager component 510 for managing at least the query process via the query engine 502, and a rules engine 512, that in this embodiment, is part of the manager component 510. In another embodiment, the rules engine 512 is separate from the manager component 510. Thus, rules can be constructed for automatic execution against queries from the IMS 408 and the 2G/2.5G legacy services.

Figure 6:
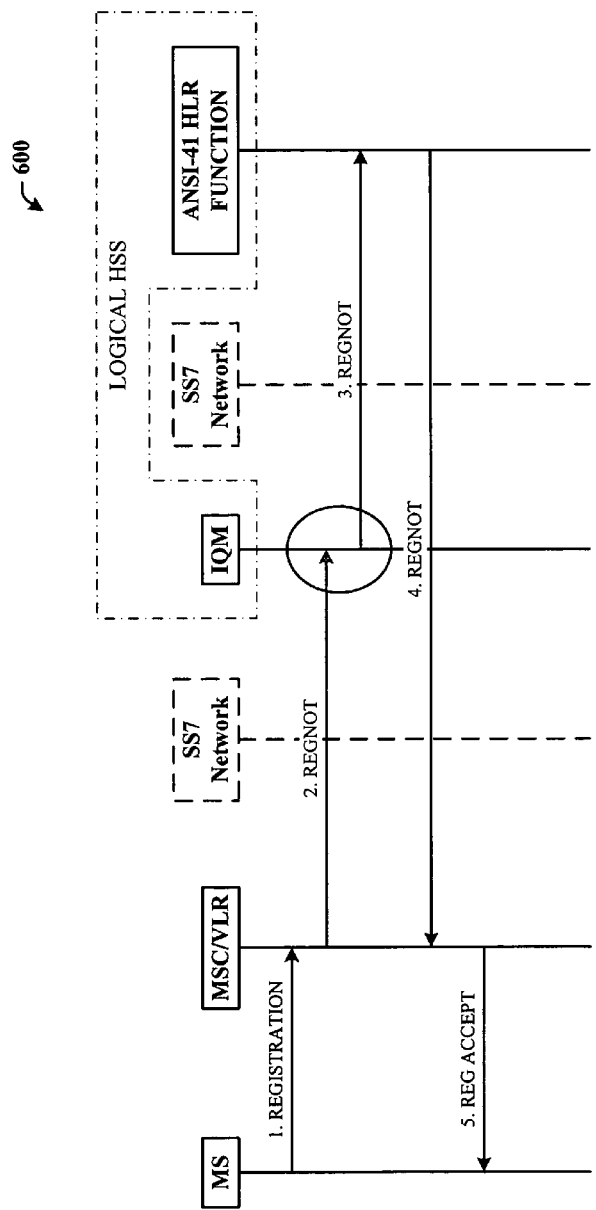
FIG. 6 illustrates a call flow diagram registration routing between a mobile station (MS) and an HLR via the IQM in accordance with the invention.

FIG. 6 illustrates a call flow diagram 600 registration routing between a mobile station (MS) and an HLR via the IQM in accordance with the invention. Registration is initiated from the MS to the 2G/2.5G services (MSC/VLR). As indicated, the IQM and HLR function form part of a logical HSS. Registration notification (REGNOT) then occurs across the SS7 network to the IQM. In order to support the transitional phase (temporarily or permanently) the IQM can redirect the ANSI-41 REGNOT message across the SS7 network to the HSS which can contain the ANSI-41 HLR. Note that the following description includes the HLR in the HSS; however, this need to not be the case. ANSI-41 is the specification for Cellular Radio Telecommunications Intersystem Operations. From the HLR within the HSS, the REGNOT is passed back to the MSC/VLR, with a registration accepted (REG ACCEPT) to the mobile station.

Figure 7:
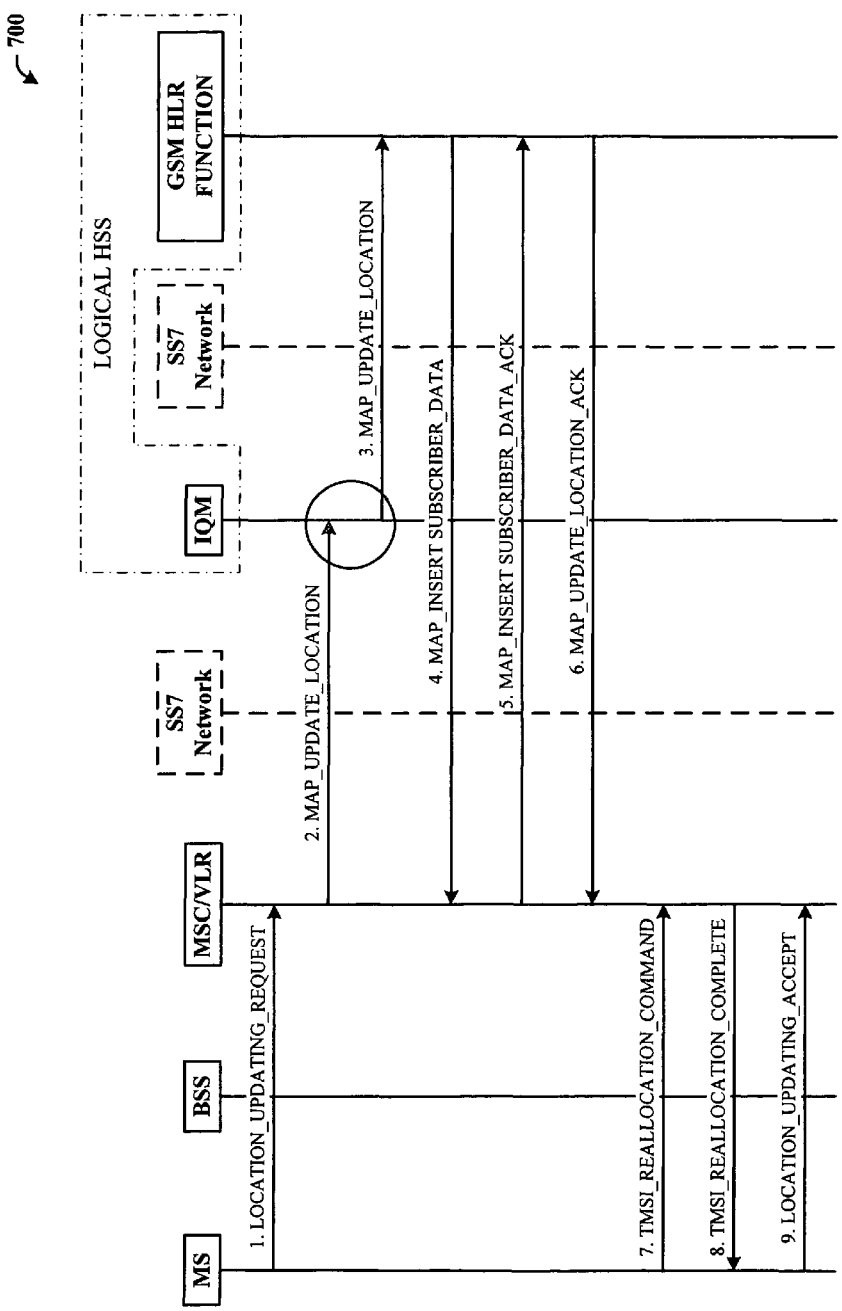
FIG. 7 illustrates a call flow diagram of GSM MAP update location routing between a MS and an HLR in accordance with the invention.

FIG. 7 illustrates a call flow diagram 700 of GSM MAP update location routing between a MS and an HLR in accordance with the invention. Initially, a LOCATION_UPDATE_REQUEST is sent from the MS to the MSC/VLR via a base station subsystem (BSS). The MSC/VLR sends a MAP_UPDATE_LOCATION message across the SS7 network to the IQM (part of the HSS). The IQM forwards the MAP_UPDATE_LOCATION message across the SS7 network to the 2G (or GSM) HLR internally within the HSS. The HLR processes the MAP_UPDATE_LOCATION message, and issues a MAP_INSERT SUBSCRIBER_DATA message back across the SS7 network to the MSC/VLR, which passes the subscriber location data to the MSC/VLR. The MSC/VLR responds back to the HLR with a MAP_INSERT SUBSCRIBER_DATA_ACK message that acknowledges receipt of the location data. The HLR then acknowledges receipt of the MAP location update by sending a MAP_UPDATE_LOCATION_ACK to the MSC/VLR. The MSC/VLR then receives a TMSI_REALLOCATION_COMMAND from the MS, and responds with a TMSI_REALLOCATION_COMPLETE message. The MS responds with a LOCATION_UPDATING_ACCEPT message that terminates the process. The TMSI (Temporary Mobile Subscriber Identity) is a temporary identity issued to a GPRS-enabled mobile and unique within a given routing area, and is used by the GPRS network to page the specified mobile.

Figure 8:
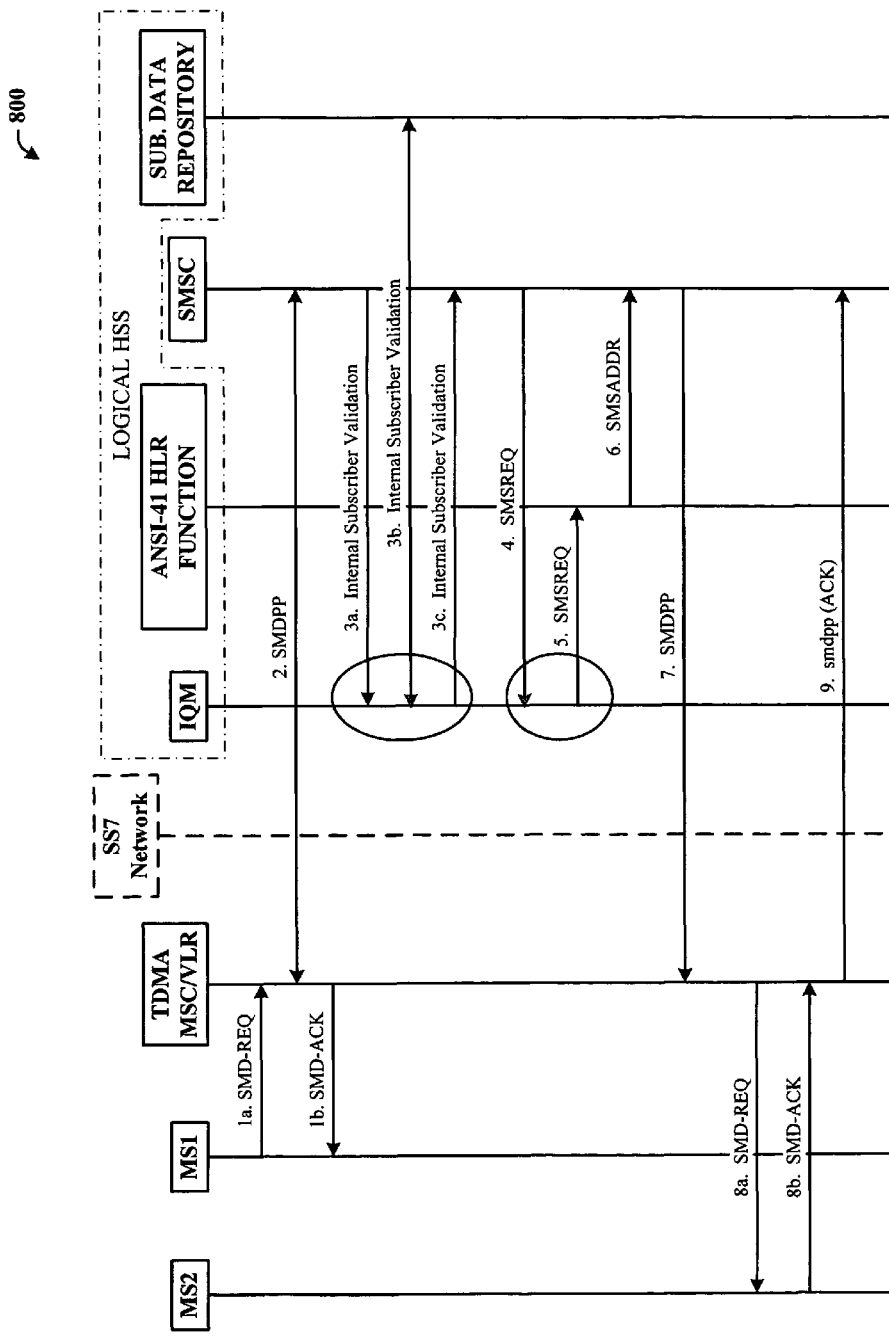
FIG. 8 illustrates a call flow diagram of a short message service (SMS) communication between two 2G mobile phones using the IQM to an HLR and MIND in accordance with the invention.

FIG. 8 illustrates a call flow diagram 800 of a Short Message Service (SMS) communication between two 2G mobile phones using the IQM to an HLR and Subscriber Data Repository in accordance with the invention. Here, the logical HSS includes the IQM, ANSI-41 HLR function and Subscriber Data Repository. A first phone (MS1) issues a short message delivery request (SMD-REQ) to the MSC/VLR via TDMA (Time Domain Multiple Access). The MSC/VLR issues an SMD-ACK to acknowledge receipt of the request. The MSC/VLR communicates the request across the SS7 network to an servicing MSC (SMSC) in a short message deliver point-to-point (SMDPP) message. The SMSC initiates an internal subscriber validation message to the IQM, in response to which the IQM passes the internal subscriber validation request with a mobile identity number (MIN) to the Subscriber Data Repository for validation. Once validated, the IQM forwards the result to the SMSC. The SMSC issues a short message service request (SMSREQ) to the IQM, which passes it to the HLR. The HLR issues an SMS address (SMSADDR) to the SMSC which is the temporary routing address of the SMS subscriber. The SMSC responds to the MSC/VLR with the routing address in an SMDPP message. The MSC/VLR sends an SMD-REQ message to the second device (MS2). MS2 acknowledges receipt of the request with an SMD-ACK message. The ACK is then forwarded to the SMSC in an SMDPP. Note that flows 3a, 3b and 3c are not SS7-based.

Figure 9:
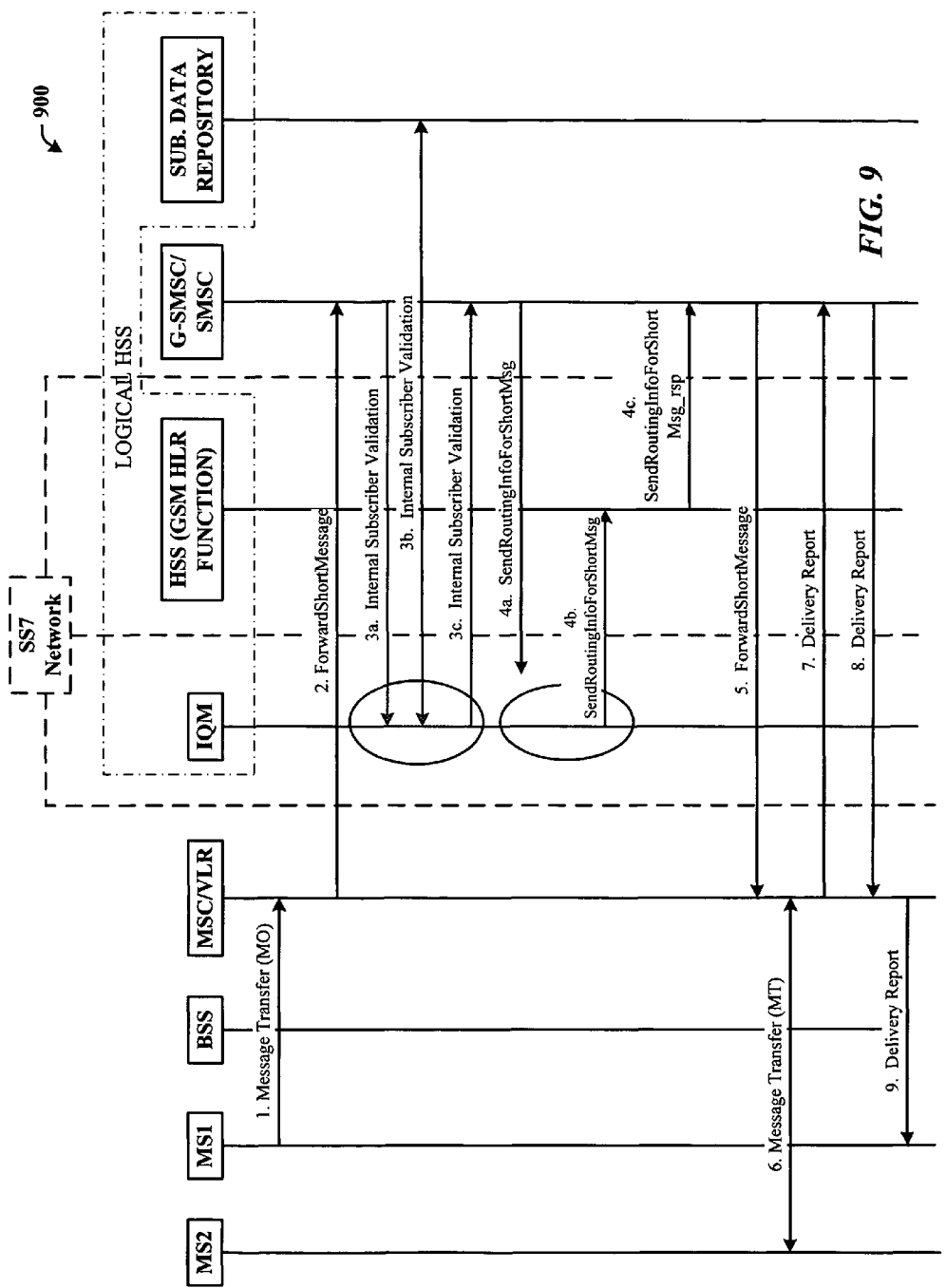
FIG. 9 illustrates a call flow diagram of a SMS communication between two 2G mobile phones using the IQM to the MIND in accordance with the invention.

FIG. 9 illustrates a call flow diagram 900 of a SMS communication between two 2G mobile phones using the IQM to the Subscriber Data Repository in accordance with the invention. A first phone (MS1) as a mobile originator (MO) issues a message transfer request to the MSC/VLR. The MSC/VLR issues a ForwardShortMessage across the SS7 network to a G-SMSC/SMSC. The G-SMSC/SMSC initiates an internal subscriber validation message to the IQM, in response to which the IQM passes the internal subscriber validation request with MIN to the Subscriber Data Repository for validation. Once validated, the IQM forwards the result back to the G-SMSC/SMSC. The G-SMSC/SMSC issues a request for the routing information for the short message (SendRoutingInfoForShortMsg) to the IQM, which passes it to the HLR. The HLR sends the response to the G-SMSC/SMSC, which then sends the short message to the MSC/VLR. The MSC/VLR then delivers the message via a message transfer mobile terminator (MT) to the second device (MS2). A delivery report is then issued by the MSC/VLR to the G-SMSC/SMSC. The G-SMSC/SMSC issues the delivery report back to the MSC/VLR for final delivery to the first device (MS1) allowing the first user to see that the message was delivered to the second user of MS2. Note that flows 3*a*, 3*b* and 3*c* are not SS7-based.

Figure 10A:
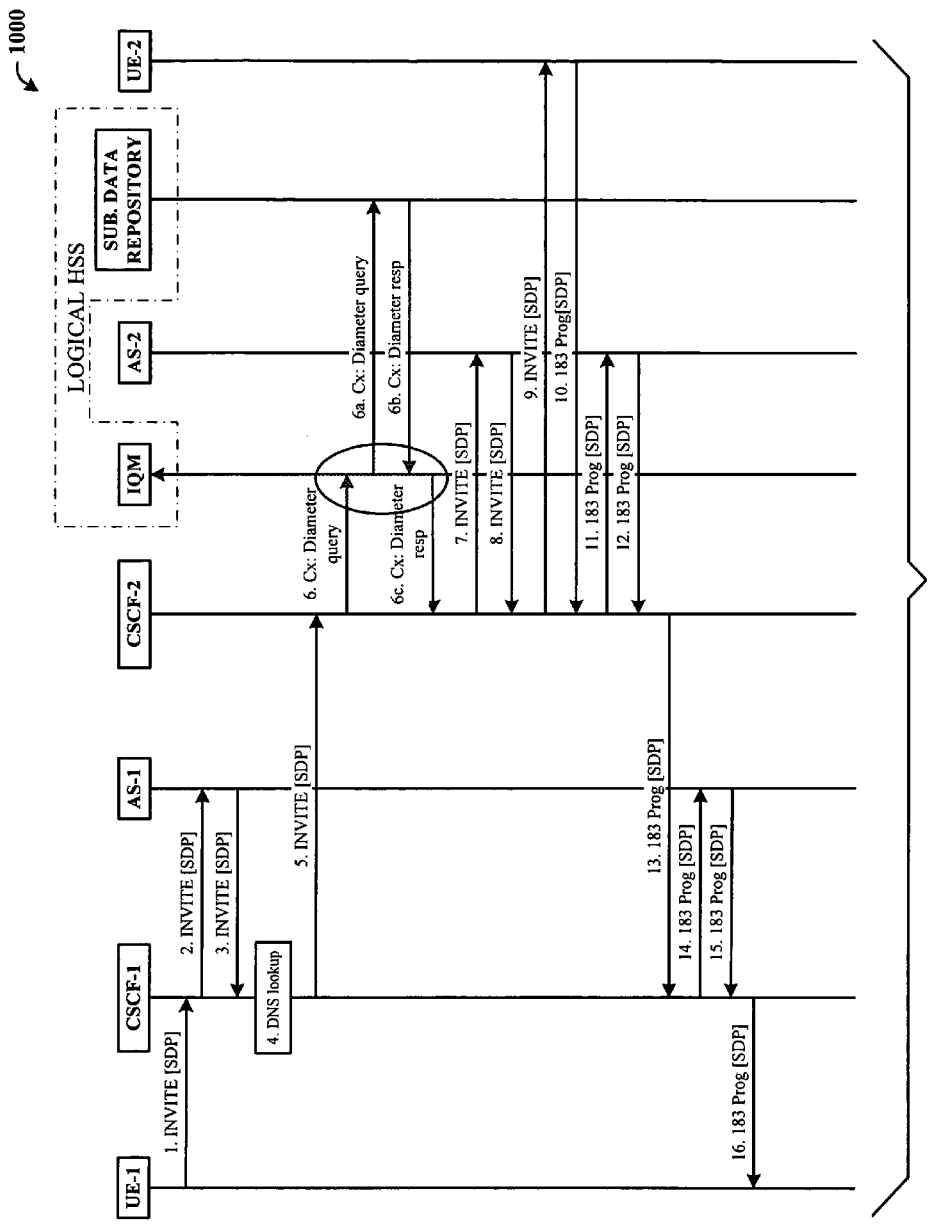
FIGS. 10A and 10B illustrate a call flow diagram of the IQM supporting IMS by queries to the HSS from an CSCF in accordance with the invention.

FIG. 10A illustrates a first part of a call flow diagram 1000 of the IQM supporting IMS by queries to the logical HSS (e.g., using the Subscriber Data Repository) from an CSCF in accordance with the invention. IMS is an overlay control network, which makes use of the underlying packet-switched domain for the transport of signaling and user data. Session Initiation Protocol (SIP), a protocol developed within the Internet Engineering Task Force (IETF), has been selected by the 3GPP as the official end-to-end IP signaling protocol for establishing multimedia sessions between the user equipment (UE) and the IMS, as well as between the components within the IMS and with other end users over the Internet. SIP session setup basically comprises of four distinct phases—the session invitation, resource reservation, session offering and session connection.

The session invitation phase starts with the calling party (UE-1) sending a SIP INVITE to the called party (UE-2) in the format of a session description protocol (SDP). The INVITE is first sent to the calling party IMS (CSCF-1), which processes the invite against the calling party SIP AS (AS-1). The SIP AS responds with the INVITE back to the CSCF for a DNS (Domain Name Server) IP address lookup. These results are then communicated to the called party IMS (CSCF-2), which then initiates a Diameter query over the Cx interface to the IQM. The IQM forwards the query to the logical HSS (e.g., using the Subscriber Data Repository), which responds back to the IQM with a Diameter response. The IQM forwards the Diameter response to the called party CSCF-2. The CSCF-2 then forwards the INVITE to the SIP AS of the called party, the response to which is returned to the CSCF-2 of the called party. The CSCF-2 then sends the INVITE message to the second user device (UE-2). The UE-2 responds with a session progress message using SDP to the CSCF-2. The session progress information is then passed to the called party SIP AS, and back to the CSCF-2. The called party IMS system then transmits the session progress information to the calling party IMS system. The progress information is processed by the calling party SIP ass and then forwarded to the calling party device (UE-1).

Figure 10B:
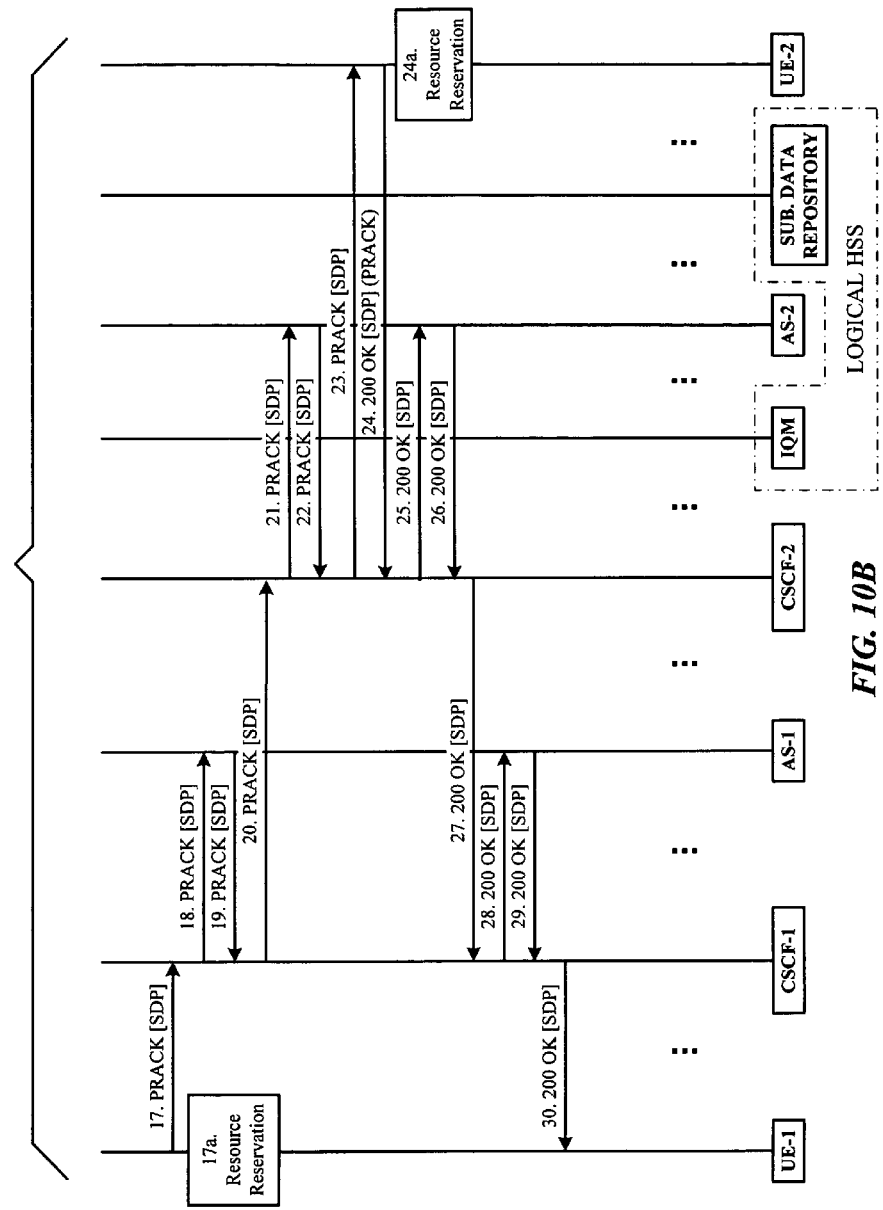

Continuing with FIG. 10B, the resource reservation phase begins with the UE-1 responding with a progress acknowledge message (PRACK) in SDP to the CSCF-1. The PRACK is processed against the SIP AS of the calling party, back to the CSCF-1 and forwarded to the called party IMS system (CSCF-2). The CSCF-2 processes the PRACK against the SIP AS of the called party, back to the CSCF-2 and on to the second user device (UE-2). This ends the resource reservation phase between the two parties by the called party device reserving resources at its end. An OK response is then forwarded back from the second user (UE-2) to the CSCF-2, the SIP AS of the called party, back to the CSCF-2, and then on to the CSCF-1 of the calling party IMS system. The OK response is then processed through the SIP AS of the calling party, and then to the first user device (UE-1). The remaining steps do not involve the HSS or the IQM. Reference can be made to the 3GPP Technical Specification 3GPP TS 24.228, the entirety of which is incorporated by reference herein.

The reservation phase reserves the necessary resources so that early tones and announcements can be played, as well as a transport bearer for the media stream being available when the called party answers. The resource reservation phase can be the most complex part of the session establishment as it is necessary to achieve the quality of service (QoS) needed in UMTS for conversational calls. Once the appropriate resources for the network and radio access bearers are available, a session offering phase begins with the called user alerted to the incoming call, and the calling party being informed by a 180 Ringing provisional response. Finally, the session is connected when the called party answers the call, and a 200 OK final response is sent and the calling party acknowledges it by sending an ACK message. The remaining steps do not involve the HSS or the IQM. Reference can be made to the 3GPP technical specifications (3GPP TS 24.228) for the remaining flows for establishing an RTP/IP bearer between UE-1 and UE-2.

Figure 11:
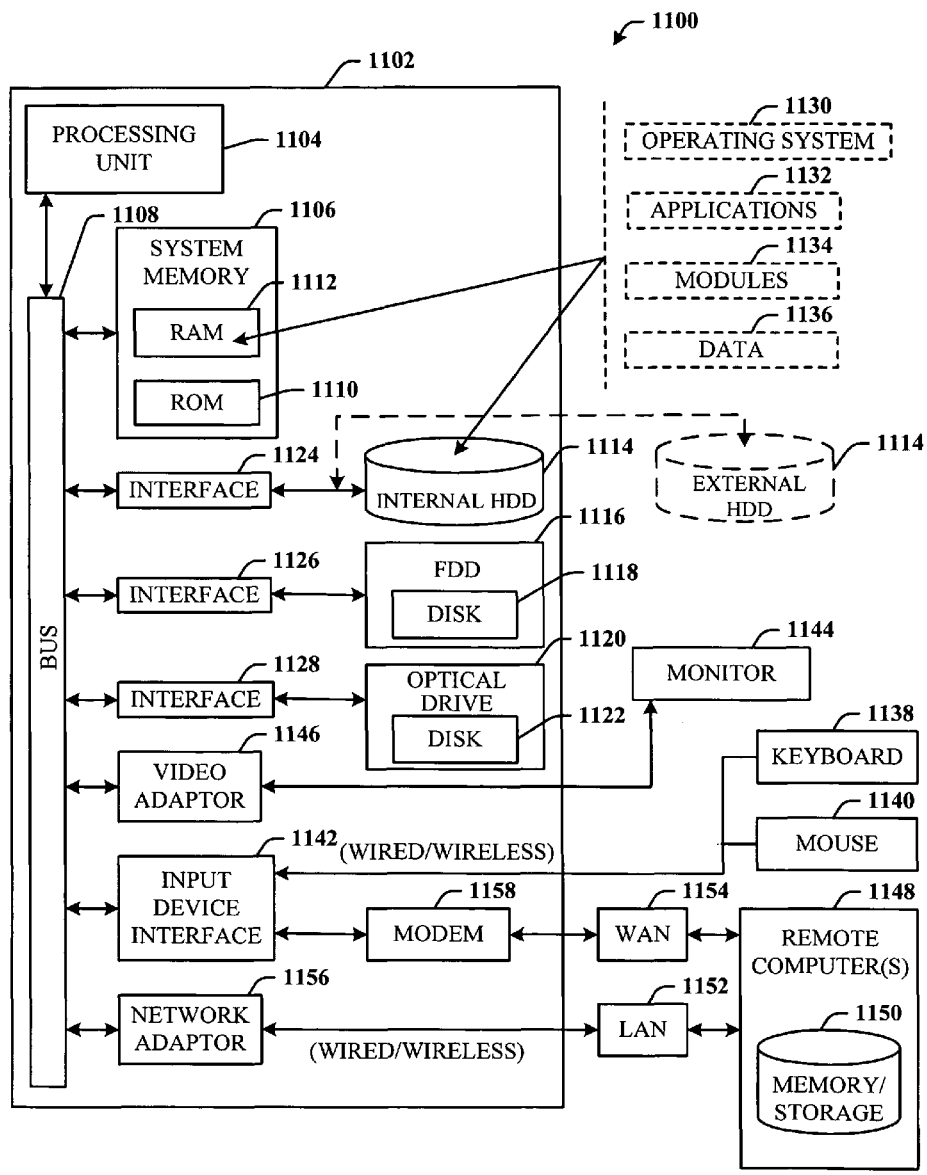
FIG. 11 illustrates a block diagram of a computer operable to execute the disclosed HSS and/or IQM architecture.

Referring now to FIG. 11, there is illustrated a block diagram of a computer operable to execute the disclosed logical HSS and/or IQM architecture. In order to provide additional context for various aspects of the subject invention, FIG. 11 and the following discussion are intended to provide a brief, general description of a suitable computing environment 1100 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the invention includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the invention can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 12:
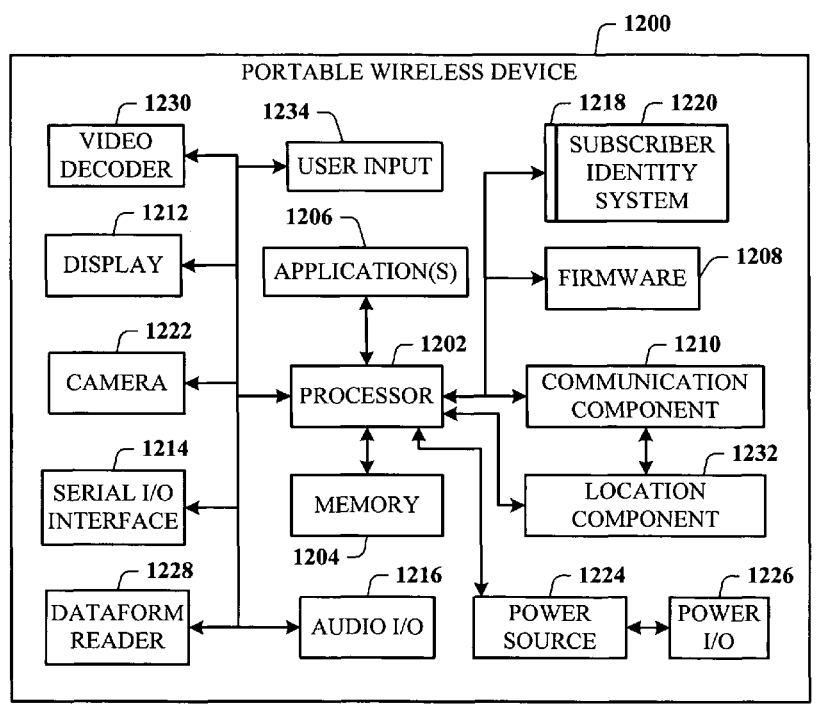
FIG. 12 illustrates a block diagram of the portable wireless device operable to benefit from the architecture of the subject invention.

Referring now to FIG. 12, there is illustrated a block diagram of the portable wireless device (PWD) 1200 operable to benefit from the architecture of the subject invention. The PWD 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signal. The applications 1206 can be stored in the memory 1204 and/or in a firmware 1208, and executed by the processor 1202 from either or both the memory 1204 or/and the firmware 1208. Here, the application(s) 1206 can include the SSA and SAP architecture of the subject invention. The firmware 1208 also stores startup code for execution in initializing the PWD 1200. A communication component 1210 interfaces to the processor 1202 to facilitate wired/wireless communication with external systems, e.g., cellular networks, VoIP networks, and so on. The communications component 1210 includes capabilities such that concurrent sessions and contexts for QoS requirements can be realized. The PWD 1200 includes devices such as a cellular telephone, a PDA with mobile communications capabilities, and messaging-centric devices.

The PWD 1200 includes a display 1212 for displaying text, images, video, telephony functions (e.g., a Caller ID function), setup functions, and for user input. The display 1212 can also accommodate the presentation of multimedia content. A serial I/O interface 1214 is provided in communication with the processor 1202 to facilitate serial communication (e.g., USB, and/or IEEE 1394) via a hardwire connection, and other serial input devices (e.g., a keyboard, keypad, and mouse). This supports updating and troubleshooting the PWD 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals via a microphone to record data and/or telephony voice data, and for inputting voice signals for telephone conversations.

The PWD 1200 includes a slot interface 1218 for accommodating a SIC (Subscriber Identity Component) in the form factor of a card Subscriber Identity Module (SIM) 1220, and interfacing the SIM card 1220 with the processor 1202. However, it is to be appreciated that the SIM card 1220 can be manufactured into the PWD 1200, and updated by downloading data and software thereinto.

The PWD 1200 can process IP data traffic via the communication component 1210 to accommodate IP traffic from an IP network such as, for example, the Internet, a corporate intranet, a home network, a person area network, etc., via an ISP or cable provider. Thus, VaI) traffic can be utilized by the PWD 1200, and IP-based multimedia content can be received in either an encoded or a decoded format.

A video processing component 1222 (e.g., a camera) can be provided for decoding encoded multimedia content. The PWD 1200 also includes a power source 1224 in the form of batteries and/or an AC power subsystem, which power source 1224 interfaces to an external power system or charging equipment (not shown) via a power I/O component 1226.

The PWD 1200 can also include a dataform reader 1228 suitably designed to read many types of dataforms. For example, the reader 1228 can scan product bar codes of two and three dimensions, and other types of indicia.

The PWD 1200 can also include a video decoder component 1230 for processing video content received and transmitted. A location tracking component 1232 facilitates geographically locating the PWD 1200. As described hereinabove, this can occur when the user initiates the feedback signal automatically or manually.

A user input component 1234 can include such conventional input device technologies such as a keypad, keyboard, mouse, stylus pen, and touch screen, for example.

Figure 13:
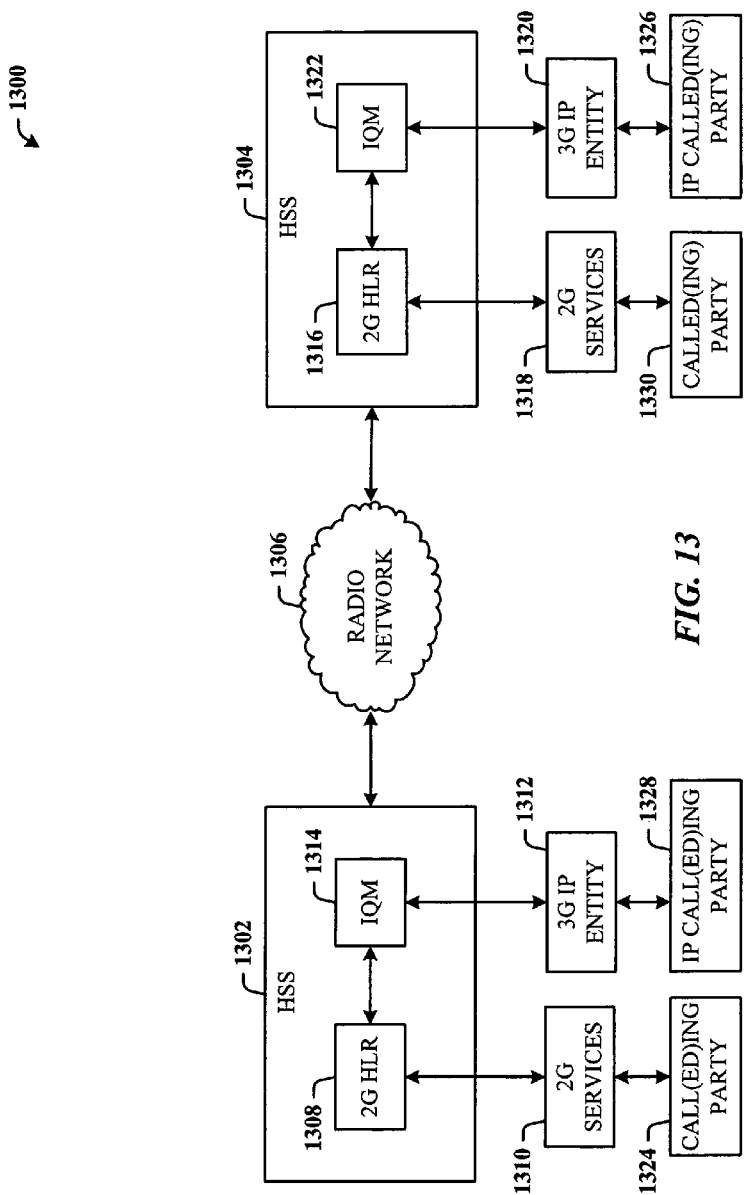
FIG. 13 illustrates a network that facilitates telecommunications in accordance with the subject invention.

FIG. 13 illustrates a network 1300 that facilitates telecommunications in accordance with the subject invention. The system 1300 includes at least a first HSS system 1302 and a second HSS system 1304 that intercommunicate through a radio network 1306. The first HSS system 1302 includes a first 2G HLR subsystem 1308 of one or more HLRs that interface to a first 2G services component 1310 and a first 3G IP entity 1312 (e.g., an IMS system). The HSS 1302 also includes a first IQM 1314 (similar to IQM 102 of FIG. 1 and IQM 500 of FIG. 5). Similarly, the second HSS system 1304 includes a second 2G HLR subsystem 1316 of one or more HLRs that interface to a second 2G services component 1318 and a second 3G IP entity 1320 (e.g., an IMS system). The HSS 1304 also includes a second IQM 1322 (similar to IQM 102 of FIG. 1 and IQM 500 of FIG. 5).

In operation, a calling party 1324 from the first 2G services domain(s) (e.g., CS and/or PS) can connect through the radio network 1306 to an IP called party 1326 of the second 3G IP entity 1320 (e.g., the IMS) by utilizing the IQM components (1314 and/or 1322) of the subject invention. Similarly, the calling party 1324 can connect through the HSS 1302 and IQM 1314 to an IP calling party 1328. The reverse is true such that the IP called party 1326 (now becoming a calling party 1326) connects through the HSS 1304 and IQM 1322 to a 2G called party 1330 and/or a remote IP calling party 1328 (who now becomes the IP called party 1328). It is to be understood that the 2G calling party 1324 can also utilize the 2G services component 1310 to connect through the HSS 1302 across the radio network 1306 to the HSS 1304 to the 2G called party via the 2G services component 1318.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile network data system that facilitates deployment of next generation services by leveraging legacy assets, comprising:
a subscriber-related information source utilized within a legacy network to store user-subscription information for at least one of a call or a session, the subscriber-related information source employed as part of a logical database for a next generation network during deployment of the next generation services; and
an intermediary query manager (IQM) component, implemented as part of the logical database in the next generation network, that interfaces to the subscriber-related information source by employing at least one of a C or D interface and facilitates interoperability between a legacy entity and a next generation entity by providing the subscription information to the next generation entity from the subscriber-related information source, wherein the next generation entity is at least one of a server, a gateway or a function within a next generation core network, and wherein the IQM component at least one of:
receives at least one of an update location message or a registration message from at least one of a Mobile Switching Center (MSC) or Visitor Location Register (VLR), over a Signaling System 7 (SS7) network and forwards the at least one of the update location message or the registration message to the subscriber-related information source over the SS7 network to facilitate update of a user equipment's (UE's) location in the subscriber-related information source, or
facilitates validation of the UE via communication with a next generation data repository and on validation, forwards a message received from a serving Mobile Switching Center (SMSC) to the subscriber-related information source to facilitate Short Message Service (SMS) communication between two or more UEs.

2. The system of claim 1, wherein the subscriber-related information source services at least one of a circuit-switch (CS) domain or a packet-switched (PS) domain.

3. The system of claim 1, wherein the subscriber-related information source further comprises a location register that interfaces to PS domain services.

4. The system of claim 1, wherein the subscriber-related information source further comprises a location register that interfaces to CS domain services.

5. The system of claim 1, wherein the subscriber-related information source further comprises a home location register (HLR) that facilitates access to PS domain and CS domain services.

6. The system of claim 5, wherein the IQM component interfaces to the HLR via an SS7 (Signaling System 7) signal.

7. The system of claim 5, wherein the IQM component interfaces to the HLR via a realtime communications architecture, which includes SIGTRAN (Signaling Transport) MAP (Mobile Application Part).

8. The system of claim 1, wherein the next generation entity is an Internet Protocol (IP) entity.

9. The system of claim 1, wherein the next generation entity is an IP Multimedia Subsystem (IMS).

10. The system of claim 1, wherein the IQM component communicates with the next generation entity via a protocol that is at least one of SOAP (Simple Object Access Protocol), RPC (Remote Procedure Call), or CORBA (Common Object Request Broker Architecture).

11. The system of claim 1, wherein the IQM component communicates with the next generation data repository, which includes a database that employs at least one of Lightweight Directory Access Protocol (LDAP) or Structured Query Language (SQL).

12. The system of claim 11, further comprising, a provisioning system that interfaces to the subscriber-related information source and the next generation data repository for at least one of exchange or updating of the subscription information.

13. The system of claim 1, wherein the IQM component communicates with a SIP (Session Initiation Protocol) application server.

14. The system of claim 1, wherein the IQM component communicates with an IMS Service Switching Function component.

15. The system of claim 1, wherein the IQM component communicates with a service switching component that provides one or more call state models which define a call processing architecture within an IMS.

16. The system of claim 15, wherein the service switching component is an SSF (Service Switching Function) component and the one or more call state models are processed by a CAMEL (Customized Applications for Mobile network Enhanced Logic) Service Environment.

17. The system of claim 1, wherein the IQM component communicates with a call session component that provides control and routing functions for IP sessions.

18. The system of claim 17, wherein call session component is a Call Session Control Function (CSCF) component.

19. The system of claim 1, wherein the IQM component interfaces with an AAA (Authentication, Authorization and Accounting) service to manage security.

20. The system of claim 19, wherein the AAA services is a Diameter server.

21. A non-transitory computer-readable medium having stored thereon computer-executable instructions for carrying out the system of claim 1.

22. A server that employs the system of claim 1.

23. A mobile network data system for transitioning to a next generation database, comprising:
a legacy home location register (HLR) as part of a logical next generation Home Subscriber Server (HSS) that processes location register data; and
an IQM component as part of the logical next generation HSS that interfaces to the legacy HLR by employing at least one of a C or D interface and facilitates interoperability between a legacy entity and a next generation entity by supporting next generation interfaces specific to an IMS (IP multimedia subsystem), wherein the IQM component provides a capability for the next generation entity to leverage usage of the legacy HLR without migrating subscriber information from the legacy HLR to a next generation database during provisioning of the next generation network, and wherein the IQM component at least one of:
receives at least one of an update location message or a registration message from at least one of a Mobile Switching Center (MSC) or Visitor Location Register (VLR), over a Signaling System 7 (SS7) network and forwards the at least one of the update location message or the registration message to the legacy HLR over the SS7 network to facilitate update of a user equipment's (UE's) location in the legacy HLR, or
communicates with a data repository within the logical next generation HSS to validate the UE and on successful validation, forwards a message received from a serving Mobile Switching Center (SMSC) to the legacy HLR to facilitate Short Message Service (SMS) communication between the UE and at least one disparate UE.

24. The system of claim 23, wherein the logical next generation HSS interfaces to one or more legacy HLRs such that CS domain and PS domain services are processed.

25. The system of claim 23, wherein the IQM component interfaces to the legacy HLR via at least one of an SS7 signal or a SIGTRAN MAP architecture.

26. The system of claim 23, wherein the next generation entity is an IMS entity.

27. The system of claim 23, wherein the IQM component communicates with the next generation entity via a protocol that is at least one of Simple Object Access Protocol (SOAP), Remote Procedure Call (RPC), or Common Object Request Broker Architecture (CORBA).

28. The system of claim 23, wherein the IQM component communicates with a data repository of the logical next generation HSS via a protocol that employs at least one of Lightweight Directory Access Protocol (LDAP) or an Structured Query Language (SQL).

29. The system of claim 23, wherein the IQM component communicates with a Session Initiation Protocol (SIP) application server.

30. The system of claim 23, wherein the IQM component communicates with an IP Multimedia-Service Switching Function (IM-SSF) component that provides one or more call state models, which define a call processing architecture.

31. The system of claim 30, wherein the one or more call state models are processed by a Customized Applications for Mobile network Enhanced Logic (CAMEL) Service Environment.

32. The system of claim 23, wherein the IQM component communicates with a Call Session Control Function (CSCF) component that provides at least one of a control or routing function for an IP session.

33. The system of claim 23, wherein the IQM component interfaces with an Authentication, Authorization and Accounting (AAA) service to manage security.

34. A computer-implemented method of evolving a legacy storage medium to a next generation storage medium comprising:
utilizing a next generation interface to communicate with an IP multimedia subsystem (IMS);
utilizing a legacy interface to communicate with the legacy storage medium, the legacy storage medium stores subscriber information associated with multiple Mobile Switching Centers (MSCs);
translating services between at least the IMS and the legacy storage medium by employing the next generation interface and the legacy interface;
providing a portion of the subscriber information to a next generation entity from the legacy storage medium without migrating the subscriber information to the next generation storage medium during transition from a legacy network to a next generation network;
receiving, in a next generation network, at least one of an update location message or a registration message from at least one of a Mobile Switching Center (MSC) or Visitor Location Register (VLR), over a Signaling System 7 (SS7) network;
forwarding the at least one of the update location message or the registration message to the legacy storage medium over the SS7 network to facilitate update of a user equipment's (UE's) location in the legacy storage medium;
validating the UE via communication with the next generation storage medium; and
forwarding a message received, in the next generation network, from a serving Mobile Switching Center (SMSC) to the legacy storage medium to facilitate Short Message Service (SMS) communication between the UE and a disparate UE, if the validating is successful.

35. The method of claim 34, further comprising, routing communications between a CS Domain entity of legacy services and a next generation IP entity.

36. The method of claim 34, further comprising, routing communications between a PS Domain entity of legacy services and a next generation IP entity.

37. The method of claim 34, further comprising, wherein the receiving includes receiving a registration notification from a mobile station via the MSC and the forwarding the at least one of the update location message or the registration message includes forwarding the registration notification to an American National Standards Institute (ANSI)-41 HLR within the next generation storage medium.

38. The method of claim 37, wherein the forwarding the registration notification includes forwarding the registration notification across an SS7 network.

39. The method of claim 34, further comprising, processing a location update request via an intermediary query manager (IQM) component.

40. The method of claim 34, wherein the forwarding the message includes forwarding at least one of a short message service request (SMSREQ) or a request for the routing information for the short message (SendRoutingInfoForShortMsg) to the legacy storage medium.

41. The method of claim 34, wherein the receiving includes receiving the update location request that utilizes GSM Mobile Application Part (MAP) technology.

42. The method of claim 34, further comprising, processing a short message service (SMS) delivery request received via the SMSC and retrieving a SMS address from the legacy storage medium.

43. The method of claim 42, wherein the processing includes processing the short message service (SMS) delivery request which is between a first and a second mobile station.

44. The method of claim 42, wherein the processing comprises communicating subscriber validation information to the SMSC.

45. The method of claim 42, wherein the processing comprises communicating subscriber validation information to a subscriber data repository.

46. The method of claim 34, further comprising, communicating the short message service delivery request to the SMSC.

47. The method of claim 34, further comprising, communicating the short message service delivery request to the next generation storage medium.

48. The method of claim 34, further comprising, communicating routing information to at least one of the next generation storage medium, a gateway-SMSC or the SMSC.

49. The method of claim 34, further comprising, receiving at least one of an Authentication, Authorization and Accounting (AAA) query or an AAA response.

50. The method of claim 34, further comprising, sending at least one of an AAA query or an AAA response.

51. A system that facilitates interfacing entities between a legacy network and a next generation network, comprising:
means for storing subscriber-related information associated with multiple Mobile Switching Centers (MSCs) in a legacy network;

means for interfacing with an IP multimedia subsystem (IMS), wherein the means for interfacing communicates with the means for storing by employing a legacy interface; and means for translating services between at least the IMS and the means for storing by employing the means for interfacing with the IMS and the means for interfacing with the legacy database wherein the means for translating provides subscriber-related information to next generation services from the means for storing without migrating the subscriber-related information to a next generation storage medium when the next generation network is deployed, wherein the means for translating resides within the next generation network and at least one of:

receives at least one of an update location message or a registration message from at least one of a Mobile Switching Center (MSC) or Visitor Location Register (VLR), over a Signaling System 7 (SS7) network and forwards the at least one of the update location message or the registration message to the means for storing over the SS7 network to facilitate update of a user equipment's (UE's) location in the legacy storage medium, or validates the UE via communication with the next generation storage medium and forwards a message received from a serving Mobile Switching Center (SMSC) to the means for storing to facilitate Short Message Service (SMS) communication between the UE and a disparate UE, if the validating is successful.

52. The system of claim 51, further comprising means for Authentication, Authorization and Accounting (AAA)-processing via Diameter.

* * * * *